(12) United States Patent  
Marmaropoulos

(10) Patent No.: US 6,985,069 B2
(45) Date of Patent: Jan. 10, 2006

(54) REMOTE CONTROL WITH STATUS INDICATOR

(75) Inventor: George Marmaropoulos, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 931 days.

(21) Appl. No.: 09/730,658

(22) Filed: Dec. 6, 2000

(65) Prior Publication Data

US 2002/0067283 A1 Jun. 6, 2002

(51) Int. Cl.
G05B 23/02 (2006.01)

(52) U.S. Cl. .................. 340/3.9; 340/825.22; 340/3.1; 340/999; 340/825.72; 348/734; 398/107; 398/108

(58) Field of Classification Search ............. 340/999, 340/3.1, 3.7, 3.71, 3.9, 825.22, 825.69; 348/734; 398/107–108; 341/175–176
See application file for complete search history.

(56) References Cited

U.S. PATENT DOCUMENTS

| 5,455,570 | A | | 10/1995 | Cook et al. ................ 340/825 |
| 5,537,106 | A | | 7/1996 | Mitsuhashi ................ 340/825 |
| 5,905,442 | A | | 5/1999 | Mosebrook et al. ........ 340/825 |
| 6,004,490 | A | * | 12/1999 | Tsai .......................... 264/40.5 |
| 6,097,441 | A | | 8/2000 | Allport ...................... 348/552 |
| 6,160,491 | A | * | 12/2000 | Kitao et al. ............ 340/825.69 |
| 6,335,736 | B1 | * | 1/2002 | Wagner et al. ............. 715/716 |
| 6,407,779 | B1 | * | 6/2002 | Herz ......................... 348/734 |
| 6,545,587 | B1 | * | 4/2003 | Hatakeyama et al. ...... 340/3.31 |
| 6,778,225 | B2 | * | 8/2004 | David ........................ 348/734 |

FOREIGN PATENT DOCUMENTS

| WO | 9822889 A1 | 5/1998 |
| WO | 9917549 A1 | 4/1999 |

* cited by examiner

Primary Examiner—Jeffery Hofsass
Assistant Examiner—Eric Blount

(57) ABSTRACT

A remote control for controlling consumer electronic devices and/or PC's. The remote control including a progress/status indicator for indicating the status of a download process or the status of an e-wallet.

6 Claims, 3 Drawing Sheets

REMOTE CONTROL WITH STATUS INDICATOR

FIELD OF THE INVENTION

The present invention relates in general to remote controls for controlling interactive television devices and in particular to a remote control with a progress/status indicator.

BACKGROUND OF THE PRIOR ART

It is becoming more and more popular to access the Internet or other data source using the family television receiver. The family television is now able to perform multiple functions such as connecting to a WebTV for accessing the Internet, connecting to a Tivo® personal video recorder to download program guides or becoming truly an interactive television with two way communication. Digital TV and interactive TV introduce these new functionalities to the TV users and give the home viewer the ability to download various forms of data or the ability to perform e-commerce transactions etc. using their family television.

One of the problems associated with a multifunction television is that others in the room want to watch a television program while another is trying to download her favorite MP3 file using the WebTV. The download process is sometimes time consuming depending on the bandwidth of the connection and the size of the file, and interferes with watching a television program. When the user initiates the download process the user must switch back and forth between watching the television and checking the download status of an on-screen download status indicator. This switching back and forth is quite annoying to someone trying to watch a television program. Even if the user has the ability to place the WebTV Internet site in the picture-in-picture portion of the television screen to monitor the download status while watching a television program in the main portion of the screen, others in the room are subject to also watching the television program with the annoying PIP display of which they may have no interest. Similarly, even with interactive television an on-screen download display takes up valuable screen space.

There is associated with the Internet "down time" when the web page or other data is being loaded into memory or trying to be accessed. During this time period it would be nice to view another television program and be notified when the download is complete.

It is also becoming popular to have electronic wallets associated with e-commerce. The amount available in the e-wallet should be readily accessible.

SUMMARY OF THE INVENTION

Accordingly it is an object of the invention to provide a progress/status indicator on the remote control.

It is another object of the invention to provide a download status indicator on the remote control which indicates the percent completion of the download.

It is a further object of the invention to provide a download indicator that doesn't occupy any of the valuable screen space.

It is yet another object of the invention to enable the user to monitor the progress of the download process even with the TV turned off or tuned to another channel.

It is even a further object of the invention to provide an indicator on the remote control which indicates the status of an electronic wallet, e.g. whether it is full or empty.

It is yet even a further object of the invention to store the e-wallet in the remote control itself with a status indictor on the remote.

Still other objects and advantages of the invention will in part be obvious and will in part be apparent from the specification.

The invention accordingly comprises the apparatus embodying the features of construction, combination of elements and arrangement of parts, all as exemplified in the following detailed disclosure, and the scope of the invention will be indicated in the claims.

DETAILED DESCRIPTION OF THE PREFERRED EMBODIMENTS

Figure 1:
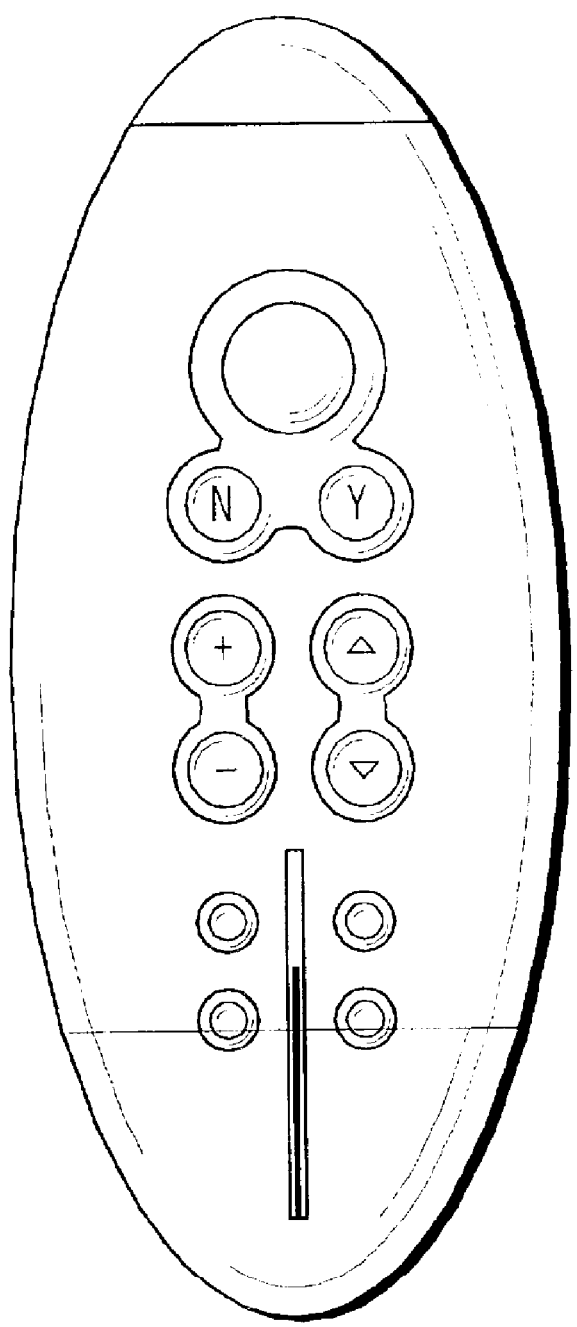
FIG. 1 shows a remote control in accordance with the invention.

FIG. 1 shows a remote control 10 in accordance with a preferred embodiment of the invention. The remote control has the typical volume up/down and channel up down features along with some additional functionality for accessing a data source, such as a track ball and Yes and No buttons. The remote interacts with the consumer electronic devices such as the TV using IR or some other form of electromagnetic communication medium. This remote control is also capable of receiving IR or some other form of electromagnetic signal from a consumer electronic device using technologies such as Bluetooth, wireless serve, wireless Ethernet etc. Also included on the remote control 10 is a status indicator, which in this case, is in the form of a longitudinal bar. This progress/status indicator is used to indicate the progress or status of a variety of activities such as the percent completion of downloading a file or a web page, the amount of money left in your electronic wallet etc. The status indication can take many forms such as a bank of LED's, or a LCD screen for displaying numerals or images, etc.

Figure 2:
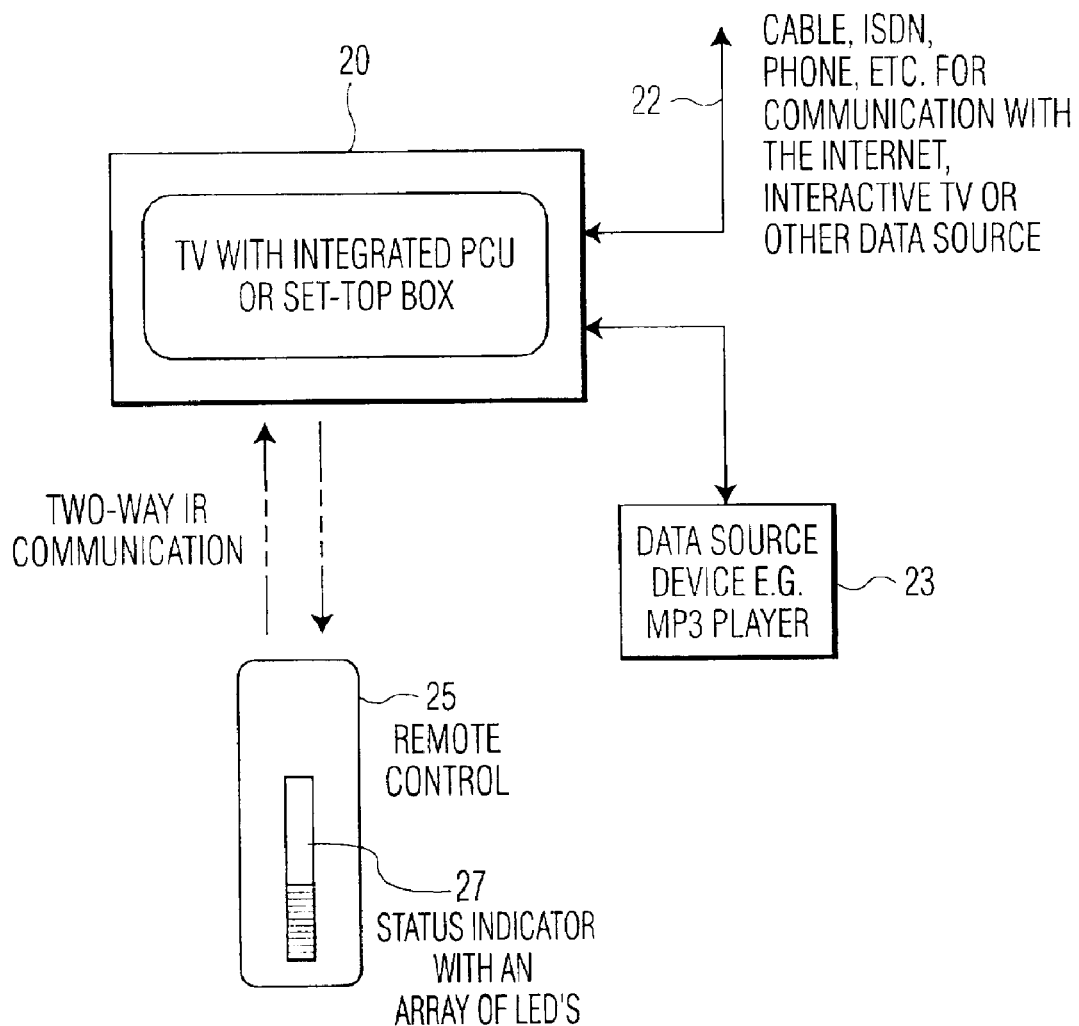
FIG. 2 shows a block diagram of a system which uses the remote control with a multifunctional television apparatus.

FIG. 2 shows a block diagram of a preferred embodiment of the invention. The television or set-top-box or other consumer electronics device 20 is connected to a data source 22 or 23. The data 22 source is accessed via a cable, ISDN, phone line etc. and includes the Internet, Interactive television data services etc. Other data sources are also available which are more local storage devices such as an MP3 player or P.C. 23. A remote control 25 is used to control the television 20. The television 20 is also operable to communicate with the remote control. The communication link between the television 20 and the remote control 25 can also take many forms such as IR, Bluetooth etc. The remote control 25 includes a status indicator 27 which indicates the status of a download process. In this embodiment the status indicator is in the form of an LED bank.

Figure 3:
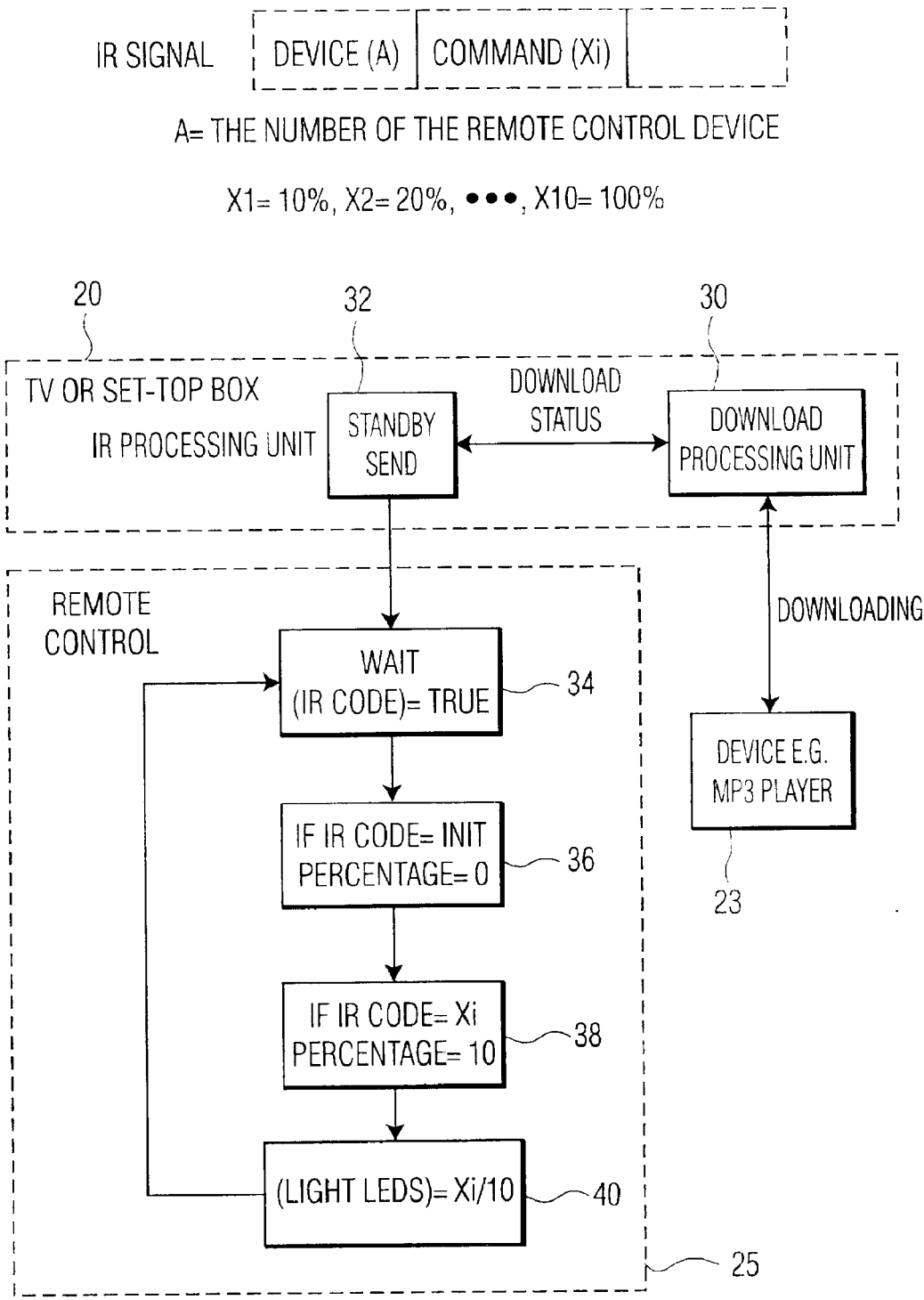
FIG. 3 shows a flow chart of a preferred embodiment of the invention.

FIG. 3 shows a flowchart of the instant invention. The television or set-top-box etc. 20 includes a download processing unit 30 and an IR processing unit 32. The download processing unit 30 accesses the data source 23 and detects the file size and computes based on the transmission link between the television 20 and the data source 23 the approximate time for download. Alternatively, the download processing unit may use the file size and compute the percent completion of the download process by subtracting the amount of data received from the total file size to determine a percent completed indicator or download status indicator.

The IR processing unit 32 then initiates an IR connection 34 with the remote control 25 and sends an IR code indicating the percent of completion of the download process 36, 38. The LED bank is then lit to indicate in some way the percent completion 40. The indicator could be a longitudinal bar status indicator as shown in FIG. 2, or it could be a numerical indication such as "89%".

It should be noted that the term remote control includes any device which sends control commands to another device in a local setting such as a typical television or consumer electronics remote control, a mouse, a keyboard, etc.

In another embodiment of the invention the status indicator 27 is used to indicate the availability of funds in an e-wallet. An electronic wallet (e-wallet) is a software application or automated service that assists consumers in conducting online commerce by allowing them to store billing, shipping and payment information and to use this information to automatically complete a web merchant's sales order form. Taking the name from its physical-world equivalent, the e-wallet is intended to provide a convenient and ubiquitous storage place for a consumer's personal data and payment mechanisms. This greatly simplifies an online commerce transaction and the consumer's overall online experience.

An example of an embodiment of the invention in use with an e-wallet is as follows. The remote control 25 itself can represent a type of electronic wallet charged only with a limited amount of money that is available to spend on purchases via the television 20. The remote device can be charged similarly to prepayment devices such as phone cards and prepayment gas meters. The status indicator 27 indicates the amount or the percentage of money available to spend.

Similarly, a prepaid electronic wallet can be available on a remote server that is accessible via the consumer electronics device 20. The availability of funds can in this case be sent to the remote control 27 via the two-way IR communication.

The remote can also include an audible or visible alarm (or even a simple LED) that indicates either the completion of the downloading process or in the case of the e-wallet, to indicate that the money stored in the e-wallet dropped below a certain amount (adjustable by the user). In addition the status indicator could be personalized such as a different color or type of status indicator (especially in the case of the e-wallet (Mom's, Dad's, children) using the same remote.

It will thus be seen that the objects set forth above, among those made apparent from the preceding description are efficiently attained and, since certain changes may be made in carrying out the above construction without departing from the spirit and scope of the invention, it is intended that all matters contained in the above description and shown in the accompanying drawings shall not be interpreted in a limiting sense.

What is claimed is:

1. A remote control for controlling a consumer electronic device comprising:

a transmitter for transmitting an electromagnetic signal to the consumer electronic device to cause the consumer electronic device to download information to the consumer electronic device;

a receiver for receiving an electromagnetic signal from the consumer electronic device which indicates the status of a download process; and a progress/status indicator for indicating the status of the download process.

2. The remote control according to claim 1, wherein the progress/status indicator is a bar which indicates the percent completion of the download process.

3. The remote control according to claim 1 or 2, wherein the progress/status indicator includes alphanumeric characters for indicating the percent completion of the download process.

4. The remote control according to claim 1 or 2, further including an alarm for indicating completion of the download process.

5. The remote control according to claim 1 or 2, further including a personalization feature which personalizes the progress/status indicator.

6. A data storage access device, comprising:

a remote control;

a transmitter for communicating with the remote control;

a progress/status indicator located on the remote control which indicates the status of a download process.

* * * * *